US012598267B2

(12) United States Patent
Oyachi

(10) Patent No.: US 12,598,267 B2
(45) Date of Patent: Apr. 7, 2026

(54) IMAGE CAPTURE APPARATUS AND CONTROL METHOD

(71) Applicant: Canon Kabushiki Kaisha, Tokyo (JP)

(72) Inventor: Takahiko Oyachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 18/299,777

(22) Filed: Apr. 13, 2023

(65) Prior Publication Data

US 2023/0370566 A1     Nov. 16, 2023

(30) Foreign Application Priority Data

May 12, 2022     (JP) .................................. 2022-078953

(51) Int. Cl.
H04N 7/14          (2006.01)
(52) U.S. Cl.
CPC ............. H04N 7/147 (2013.01); H04N 7/142 (2013.01)
(58) Field of Classification Search
CPC ........ H04N 7/147; H04N 7/142; H04N 23/95; H04N 7/141
USPC .......... 348/14.12, 14.01, 14.02, 14.08, 14.09
See application file for complete search history.

(56) References Cited

U.S. PATENT DOCUMENTS

| | | | | |
|---|---|---|---|---|
| 11,290,687 B1 * | 3/2022 | Becchetti | ................. | H04N 7/15 |
| 2003/0073461 A1 * | 4/2003 | Sinclair | .................. | H05B 47/12 |
| | | | | 455/557 |
| 2019/0230283 A1 * | 7/2019 | Ollier | ................... | H04N 23/667 |
| 2021/0345172 A1 * | 11/2021 | Sugaya | ................. | H04L 1/1861 |
| 2022/0006952 A1 * | 1/2022 | Okuike | ................. | H04W 12/02 |

FOREIGN PATENT DOCUMENTS

| | | | | |
|---|---|---|---|---|
| CN | 115486090 A | * 12/2022 | .............. | H04W 4/70 |
| JP | 2012199851 A | 10/2012 | | |
| JP | 2017138972 A | 8/2017 | | |
| KR | 101846386 B1 | * 4/2018 | ......... | H04L 65/1069 |

* cited by examiner

*Primary Examiner* — Duc Nguyen
*Assistant Examiner* — Carissa A Jones
(74) *Attorney, Agent, or Firm* — Venable LLP

(57) ABSTRACT

An image capture apparatus comprises a connection unit that connects to an external apparatus, an image capture unit that captures an image, and a control unit that executes processing to transmit an image captured by the image capture unit to the external apparatus connected via the connection unit in response to a reception of an image transmission request from the external apparatus. The control unit starts a first time measuring in response to the external apparatus completing a reception of an image and starts a second time measuring in response to the control unit transmitting an image to the external apparatus, and cancels a state of executing the processing when a first amount of time elapses since the first time measuring has started or when a second amount of time elapses since the second time measuring has started.

14 Claims, 9 Drawing Sheets

FIG. 2

F I G. 3B
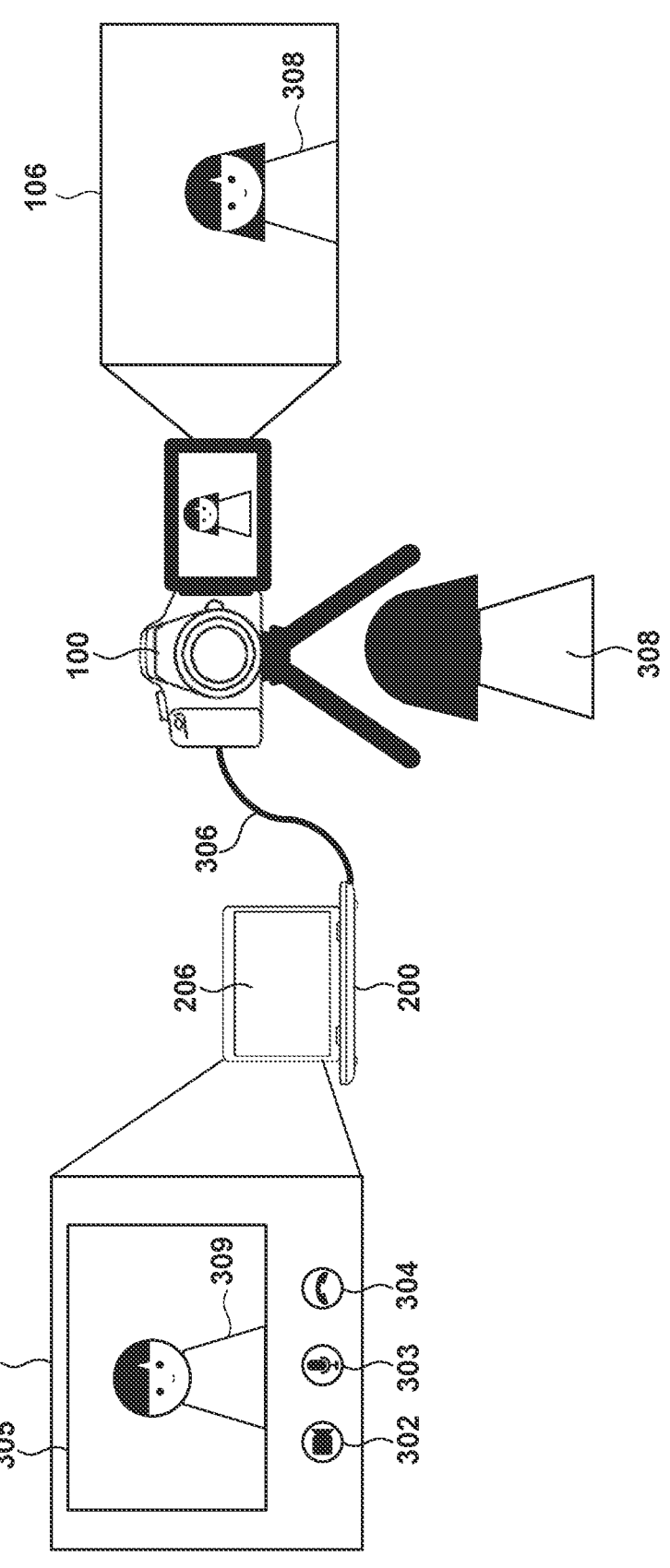

F I G. 3C
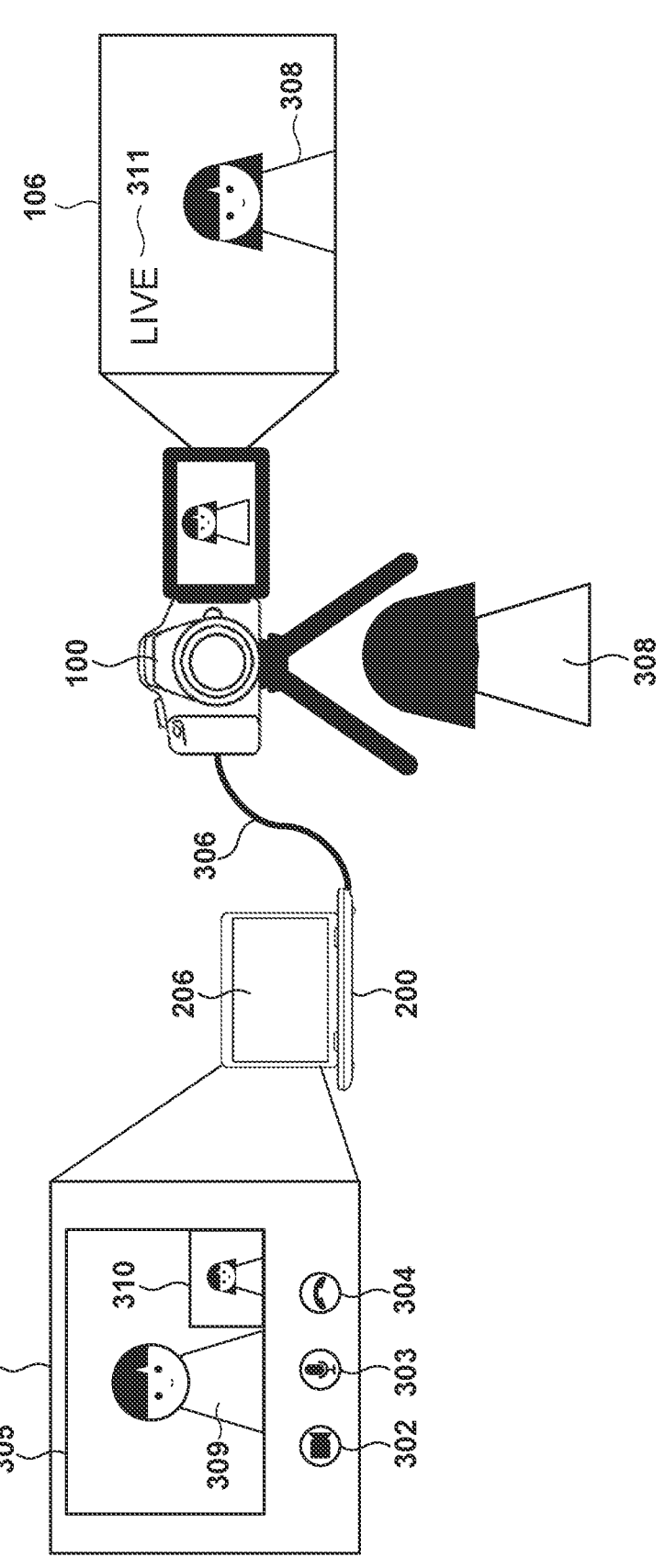

F I G. 5
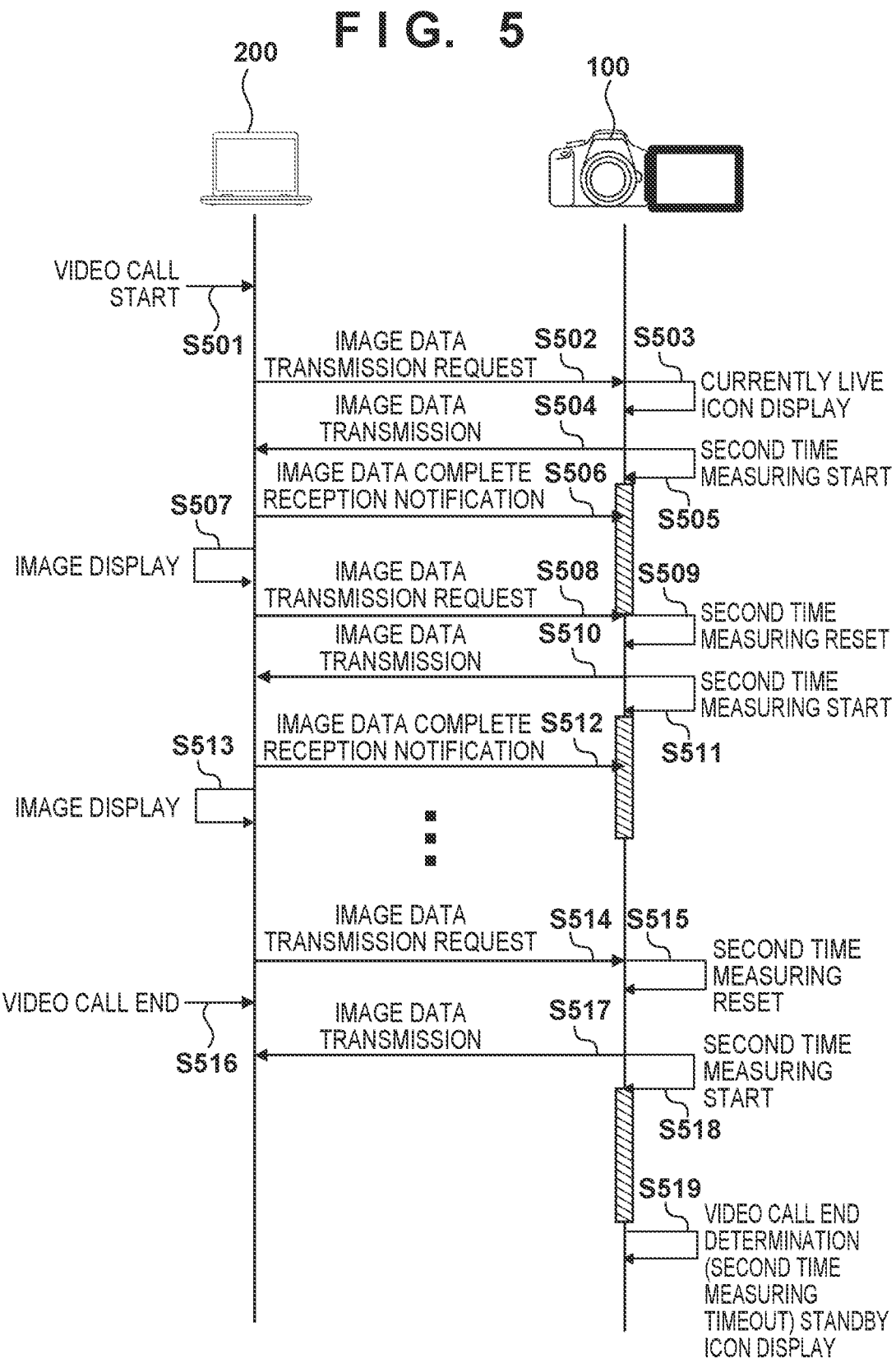

F I G.  6
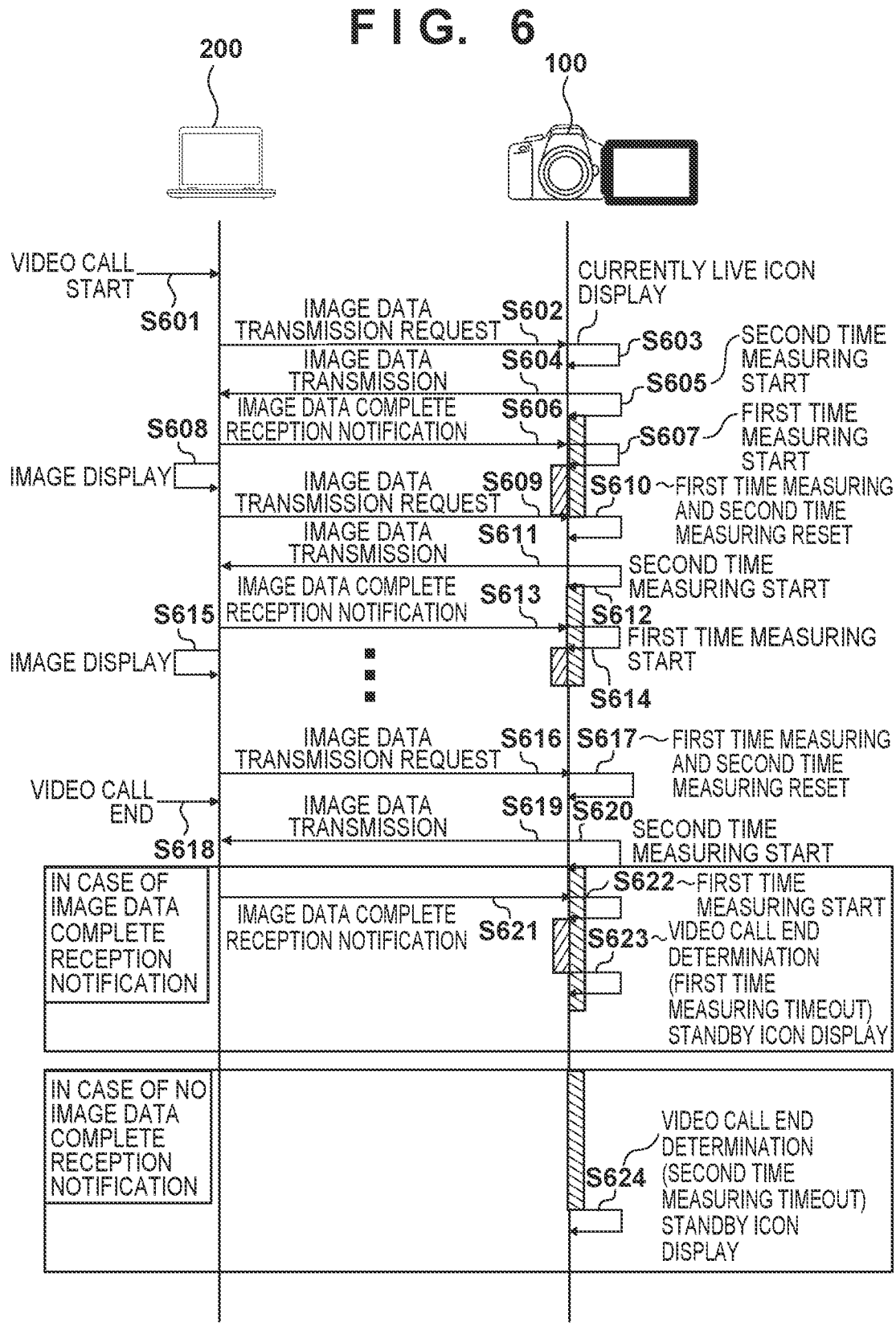

IMAGE CAPTURE APPARATUS AND CONTROL METHOD

BACKGROUND OF THE INVENTION

Field of the Invention

The present invention relates to a system in which an external apparatus and an image capture apparatus are communicatively connected.

Description of the Related Art

Online communication applications which allow users to communicate (video call, video meeting, WEB meeting, and the like) face to face online using moving images and audio have become more common. In Japanese Patent Laid-Open No. 2012-199851 and Japanese Patent Laid-Open No. 2017-138972 relating to online communication applications, methods for determining the end of a video call are described. The method described in Japanese Patent Laid-Open No. 2012-199851 determines the end of a call when a certain amount of time without talking elapses since the last time someone talked. The method described in Japanese Patent Laid-Open No. 2017-138972 switches the display on an icon of the talking partner depending on whether they are talking or not.

An image capture apparatus that captures images of the user is connected to the user device that runs the online communication application. However, it may be difficult for the image capture apparatus to determine the appropriate timing for ending a video call. Also, in Japanese Patent Laid-Open No. 2012-199851 and Japanese Patent Laid-Open No. 2017-138972, no consideration has been given to processing suited to the characteristics of the user device that runs the online communication application.

SUMMARY OF THE INVENTION

The present invention has been made in consideration of the aforementioned problems, and realizes techniques that can determine the end of online communication at an appropriate timing.

In order to solve the aforementioned problems, the present invention provides an image capture apparatus comprising: a connection unit that connects to an external apparatus; an image capture unit that captures an image; and a control unit that executes processing to transmit an image captured by the image capture unit to the external apparatus connected via the connection unit in response to a reception of an image transmission request from the external apparatus, wherein the control unit starts a first time measuring in response to the external apparatus completing a reception of an image and starts a second time measuring in response to the control unit transmitting an image to the external apparatus, and cancels a state of executing the processing when a first amount of time elapses since the first time measuring has started or when a second amount of time elapses since the second time measuring has started.

In order to solve the aforementioned problems, the present invention provides a method of controlling an image capture apparatus which has a connection unit that connects to an external apparatus and an image capture unit that captures an image, the method comprising: executing processing to transmit an image captured by the image capture unit to the external apparatus connected via the connection unit in response to a reception of an image transmission request from the external apparatus, wherein the processing includes starting a first time measuring in response to the external apparatus completing a reception of an image transmission and starting a second time measuring in response to the image capture apparatus transmitting an image to the external apparatus, and cancelling a state of executing the processing when a first amount of time elapses since the first time measuring has started or when a second amount of time elapses since the second time measuring has started.

In order to solve the aforementioned problems, the present invention provides a non-transitory computer-readable storage medium storing a program for causing a computer to function as an image capture apparatus comprising: a connection unit that connects to an external apparatus; an image capture unit that captures an image; and a control unit that executes processing to transmit an image captured by the image capture unit to the external apparatus connected via the connection unit in response to a reception of an image transmission request from the external apparatus, wherein the control unit starts a first time measuring in response to the external apparatus completing a reception of an image and starts a second time measuring in response to the control unit transmitting an image to the external apparatus, and cancels a state of executing the processing when a first amount of time elapses since the first time measuring has started or when a second amount of time elapses since the second time measuring has started.

According to the present invention, the end of online communication can be determined at an appropriate timing.

Further features of the present invention will become apparent from the following description of exemplary embodiments (with reference to the attached drawings).

BRIEF DESCRIPTION OF THE DRAWINGS

FIG. 2 is a block diagram illustrating the configuration of an information processing apparatus according to the present embodiment.

FIG. 3B is a diagram illustrating the state of the image capture apparatus and the information processing apparatus when the video call application is starting a video call according to the present embodiment.

FIG. 3C is a diagram illustrating the state of the image capture apparatus and the information processing apparatus during a video call of the video call application according to the present embodiment.

FIG. 5 is a sequence diagram illustrating a second video call end determination processing during a video call according to the present embodiment.

FIG. 6 is a sequence diagram illustrating a third video call end determination processing during a video call according to the present embodiment.

DESCRIPTION OF THE EMBODIMENTS

Figure 1A:
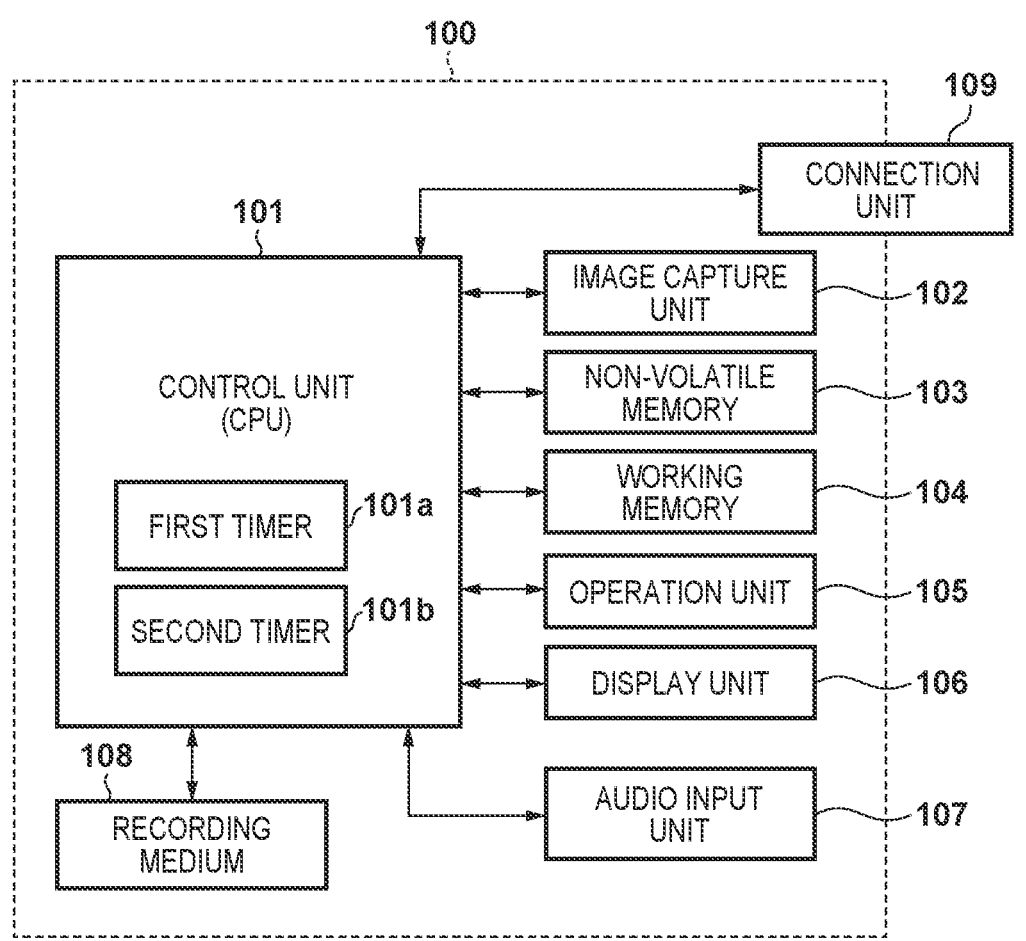
FIG. 1A is a block diagram illustrating the configuration of an image capture apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

An embodiment in which an image capture apparatus of the present invention is applied to an image generation apparatus such as a digital camera that can capture images, such as still image, moving images, and the like, and an information processing apparatus of the present invention is applied to an information processing apparatus such as a personal computer (PC) will be described later in detail with reference to the attached drawings.

First, the configuration of a system and apparatuses according to the present embodiment will be described with reference to FIGS. 1A to 1C and 2.

System Configuration

The system according to the present embodiment includes an image capture apparatus 100 and an information processing apparatus 200. The image capture apparatus 100 and the information processing apparatus 200 are communicatively connected. The image capture apparatus 100 operates as a client device, and the information processing apparatus 200 operates as a host device. In the present embodiment, in response to a reception of a transmission request for image data from the information processing apparatus 200 operating as the host device, the image capture apparatus 100 transmits the image data captured by an image capture unit 102 to the information processing apparatus 200 via a connection unit 109. The information processing apparatus 200 may or may not be provided with a characteristic of transmitting a notification of complete reception of an image data to the image capture apparatus 100 in response to a reception of the image data from the image capture apparatus 100 operating as a client device.

Also, the image capture apparatus 100 repeats the operations of starting a first time measuring by a timer in response to the information processing apparatus 200 receiving the image data, starting a second time measuring by a timer in response to a reception of a notification of complete reception of an image data from the information processing apparatus 200, and resetting the first time measuring and the second time measuring in response to a reception of an image data transmission request from the information processing apparatus 200. In this case, the image capture apparatus 100 displays first information (an icon indicating currently live) indicating that a mode state for executing processing to transmit the image data to the information processing apparatus 200 is continuing.

Also, when a first amount of time elapses since the start of the first time measuring or when a second amount of time elapses since the start of the second amount of time without an image data transmission request being received from the information processing apparatus 200, the image capture apparatus 100 determines that the video call ends and cancels the mode state for executing processing to transmit the image data. In this case, second information (an icon indicating standby) indicating that a mode state for executing processing to transmit the image data to the information processing apparatus 200 is cancelled is displayed.

Note that the image data includes formats including audio data and formats not including audio data.

Configuration of Image Capture Apparatus 100

Next, the configuration and functions of the image capture apparatus 100 according to the present embodiment will be described with reference to FIG. 1A.

Note that in the present embodiment described herein, the image capture apparatus is a digital camera or the like. However, no such limitation is intended, and the image capture apparatus may be an information communication terminal including smart devices which are a type of mobile phone, tablet devices with a camera function, and the like, a media player, a surveillance camera, a medical camera, or the like.

A control unit 101 is an arithmetic processing apparatus (CPU) that controls the image capture apparatus 100 and implements communication processing and control processing described later by executing a program stored in a non-volatile memory 103 described later. Note that instead of the control unit 101 controlling the entire apparatus, a plurality of hardware may share the processing to control the entire apparatus. Also, the control unit 101 includes a first timer 101*a* and a second timer 101*b* for measuring the amount of time used for communication processing and control processing described later according to the present embodiment.

The image capture unit 102 includes a lens group including a zoom lens and the focus lens and a shutter with a diaphragm function. Also, the image capture unit 102 includes an image sensor constituted by a CCD or CMOS element or the like that converts an object image into an electrical signal and an A/D converter that converts an analog image signal output from the image sensor into a digital signal. The image capture unit 102, via control by the control unit 101, converts, via the image sensor, object image light formed by the lens included in the image capture unit 102 into an electrical signal, performs noise reduction processing and the like, and outputs image data based on the digital signal.

The control unit 101 executes pixel interpolation, resize processing to reduce size, and color conversion processing on image data captured by the image capture unit 102. Also, the control unit 101 compresses and encodes a post-image-processing still image data using JPEG format or the like or encodes moving image data via a moving image compression method, such as MP4 format, and generates an image file, which is then stored in a storage medium 108. In the image capture apparatus 100 according to the present embodiment, the image data is stored in the storage medium 108 in accordance with Design rule for Camera File system (DCF) standards. Also, the control unit 101 performs predetermined arithmetic processing using the captured image data and executes automatic focus (AF) processing and automatic exposure (AE) processing by the control unit 101 controlling the focus lens, the diaphragm, and the shutter of the image capture unit 102 on the basis of the obtained calculation result.

The non-volatile memory 103 is a memory which is electrically erasable and recordable, such as EEPROM, for example. Constants, programs, and the like for operation of the control unit 101 are stored in the non-volatile memory 103. Herein, programs refers to programs for executing the various communication processing and control processing described later in the present embodiment.

Constants and variables for operation of the control unit 101 and programs read out from the non-volatile memory 103 are deployed on a working memory 104 used as a work area. Also, a working memory 104 is used as buffer memory that temporarily stores image data captured by the image capture unit 102 and as an image display memory for a display unit 106, and the like.

Figures 1B, 1C:
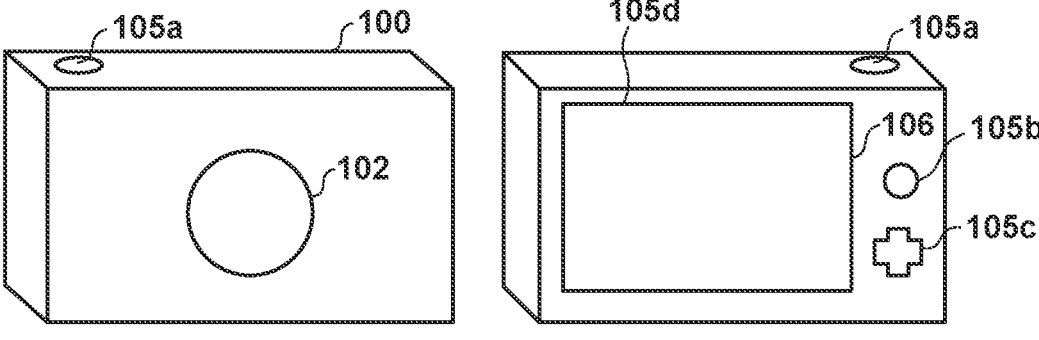
FIGS. 1B to 1C are external appearances of the image capture apparatus according to the present embodiment.

An operation unit 105 includes various switches, buttons, a touch panel, and other operation members for accepting various operations from a user. As illustrated in FIGS. 1B and 1C, for example, the operation unit 105 includes a shutter button 105a for capturing an image, a reproduction button 105b for playing back a captured image, a four-directional key 105c including up, down, left, and right buttons for setting various types of settings for the camera, and the like. The operation unit 105 also includes a touch panel 105d integrally formed with the display unit 106 described later. The operation unit 105 also includes an operation member such as a dedicated connection button for starting communication with an external apparatus via the connection unit 109 described later.

The display unit 106 displays viewfinder images while capturing images, displays captured images, displays alphanumerics for interactive operations, and the like. The display unit 106 is a liquid crystal display, an organic EL display, or a similar display device, for example. The display unit 106 may be integrally formed with the image capture apparatus 100 or may be an external device connected to the image capture apparatus 100. It is only required that the image capture apparatus 100 can connect to the display unit 106 and has a function for controlling the display of the display unit 106.

An audio input unit 107 is one or more microphones built into the image capture apparatus 100 or connected via an audio terminal. The audio input unit 107 converts the analog audio signal generated by gathering audio from the surroundings of the image capture apparatus 100 to a digital signal and outputs the digital signal to the control unit 101. The control unit 101 executes various types of audio processing on the digital signal generated by the audio input unit 107 and generates audio data.

The storage medium 108 stores the image data output from the image capture unit 102 and the audio data output from the audio input unit 107. Also, the control unit 101 reads out the image file and the audio file stored in the storage medium 108 in a reproduction mode. The storage medium 108 may be a memory card or hard disk drive installed in the image capture apparatus 100 or may be a flash memory or hard disk drive built into the image capture apparatus 100. The image capture apparatus 100 is only required to include a way of accessing the storage medium 108.

The connection unit 109 is an interface for communicatively connecting to an external apparatus such as the information processing apparatus 200. The image capture apparatus 100 according to the present embodiment can transmit and receive data with an external apparatus via the connection unit 109. For example, the image data generated by the image capture unit 102 and the audio data generated by the audio input unit 107 can be transmitted to an external apparatus via the connection unit 109. Note that in the present embodiment, the connection unit 109 is a wired communication interface, such as Universal Serial Bus (USB), HDMI (registered trademark), or the like. The control unit 101 communicates with an external apparatus by controlling the connection unit 109. Note that the communication method is not limited to a wired communication method, and a wired communication interface, such as wireless LAN compliant with IEEE 802.11 standard, an infrared communication interface, Wireless USB, and the like may be provided.

Configuration of Information Processing Apparatus 200

Figure 2:
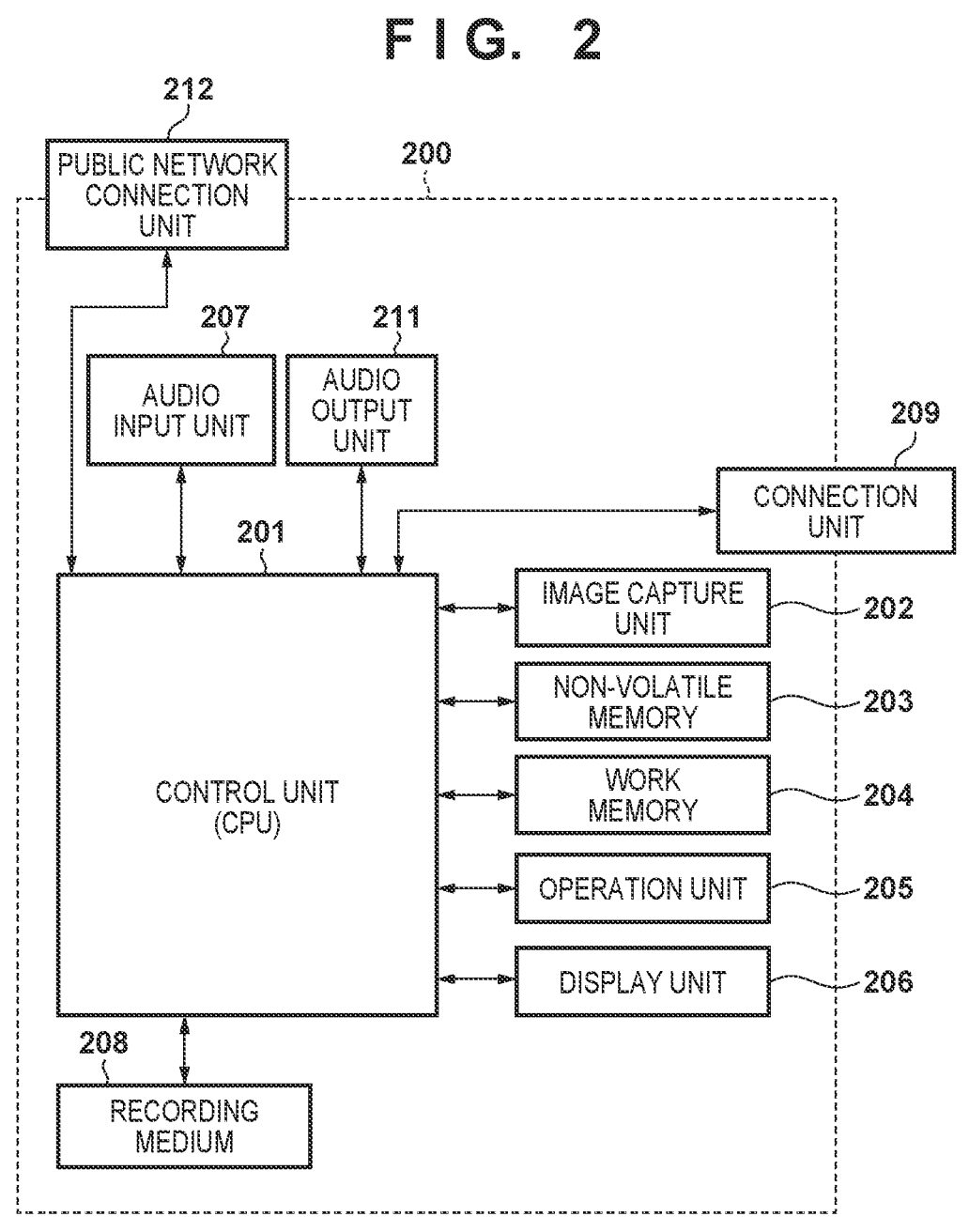

Next, the configuration and functions of the information processing apparatus 200 according to the present embodiment will be described with reference to FIG. 2.

Note that in the present embodiment described herein, an information processing apparatus such as a PC is described. However, no such limitation is intended, and the information processing apparatus may be an information communication terminal including smart devices which are a type of mobile phone, tablet devices with a communication function, and the like, a wristwatch-type smartwatch, a wearable computer such as glasses-type smart glasses, and the like.

The information processing apparatus 200 according to the present embodiment includes a control unit 201, an image capture unit 202, a non-volatile memory 203, a working memory 204, an operation unit 205, a display unit 206, an audio input unit 207, and a recording medium 208. The basic functions of these elements are the same as in the image capture apparatus 100, and thus detailed descriptions thereof will be omitted.

An operating system (OS), which is fundamental software executed by the control unit 201, and applications that cooperate with the OS to implement practical functions are stored in the non-volatile memory 203. Also, applications for communicating with the image capture apparatus 100 are stored in the non-volatile memory 203. Also, online communication applications (hereinafter, referred to as video call applications) which allow users to have a video call while being face to face online are stored in the non-volatile memory 203.

The processing of the information processing apparatus 200 according to the present embodiment is implemented by reading software provided by a video call application. Note that the video call application includes software for using the basic function of the OS installed in the information processing apparatus 200. Also, the OS of the information processing apparatus 200 may include software for implementing the processing according to the present embodiment.

A connection unit 209 includes a communication interface for wired or wireless communication with an external apparatus such as the image capture apparatus 100. The control unit 201 implements communication with the external apparatus by controlling the connection unit 209. Note that the connection unit 209 may be directly connected to the image capture apparatus 100 or may be connected via an access point or the like. For the protocol for data communication, for example, a type of USB standard, such as USB Video Class (UVC) or USB Audio Class (UAC) may be used. Note that the communication with the image capture apparatus 100 is not limited to USB. For example, an infrared communication interface or a Bluetooth (registered trademark) or a Wireless USB wireless communication interface may be used. Furthermore, a wired connection method, such as HDMI (registered trademark), IEEE 1394, or the like may be used.

An audio output unit 211 is a speaker that converts the analog audio signal generated by the audio input unit 207 to sound and externally outputs the sound.

A public network connection unit 212 is an interface used when wireless communication is performed via a wide area network (WAN), such as 4G/LTE, 5G, or the like. The information processing apparatus 200 can call another apparatus and communicate data via the public network connection unit 212. When calling, the control unit 201 performs input and output of audio signals via the audio input unit 207 and the audio output unit 211. In the present embodiment, the public network connection unit 212 is not limited to 4G/LTE and 5G and another communication method, such as Local 5G, WiMAX, ADSL, or FTTH may be used.

Video Call Operations of Image Capture Apparatus and Information Processing Apparatus Next, the operations of the image capture apparatus 100 and the information processing apparatus 200 when a video call is performed according to the present embodiment will be described with reference to FIGS. 3A to 3D.

The image capture apparatus 100 and the information processing apparatus 200 according to the present embodiment are connected via a USB or similar connection cable 306, and communication processing and control processing with the image capture apparatus 100 is executed by the video call application running on the information processing apparatus 200. Also, the information processing apparatus 200 can execute two-way communication of image data and audio data with another user device via the video call application and perform a video call with both users face to face online.

The image capture apparatus 100 is fixed on a tripod or the like, and a user 308 of the information processing apparatus 200 adjusts the capturable position and field of view in advance.

Figure 3A:
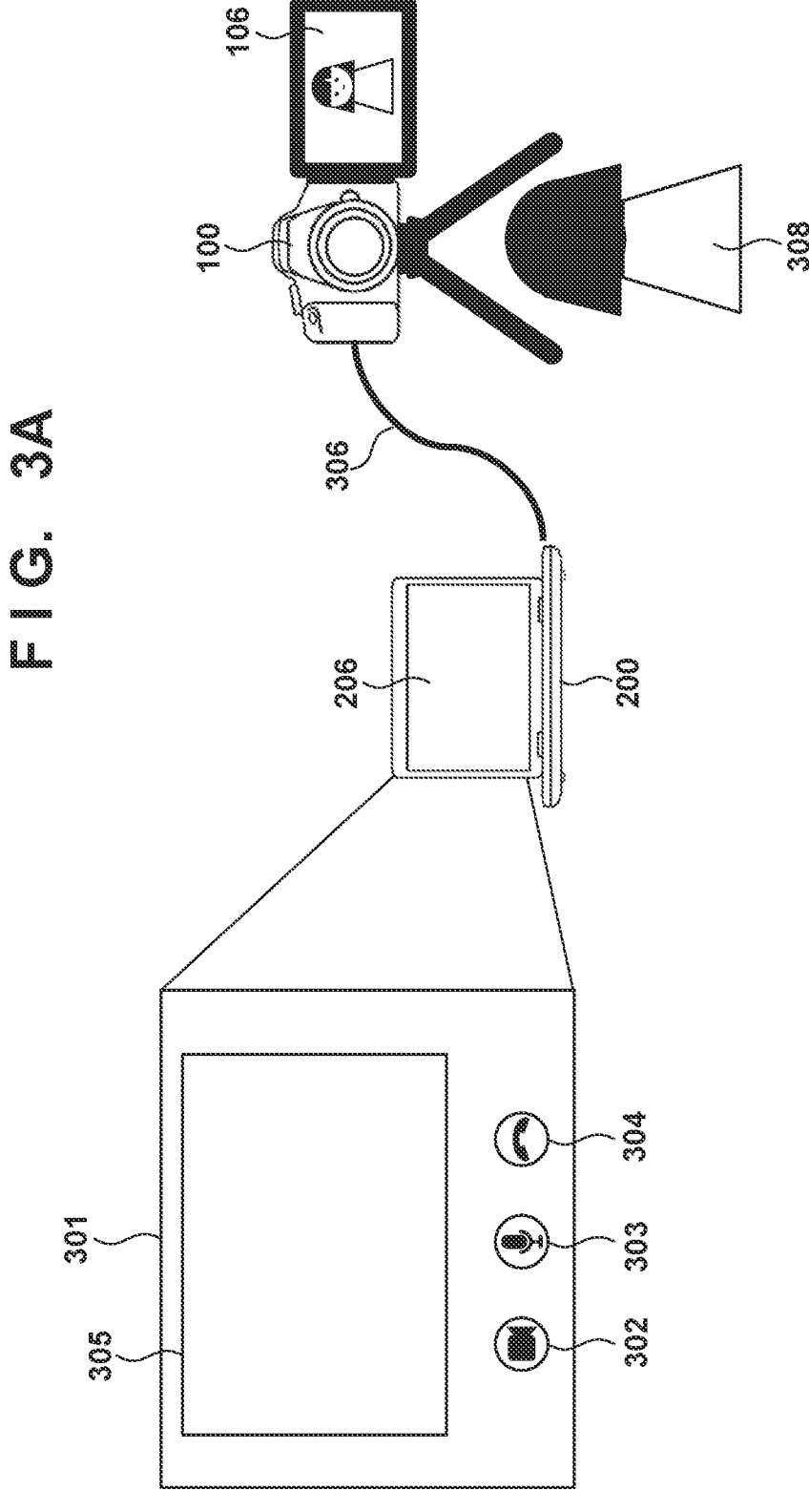
FIG. 3A is a diagram illustrating the state of the image capture apparatus and the information processing apparatus when a video call application is in standby according to the present embodiment.

FIG. 3A illustrates an example of the state of the image capture apparatus and the information processing apparatus when the video call application is in standby according to the present embodiment.

An image of the user 308 captured by the image capture apparatus 100 is displayed on the display unit 106 of the image capture apparatus 100.

The video call application displays, on the display unit 206 of the information processing apparatus 200, a GUI 301 including a screen 305 for displaying a user image of a talking partner 309, an image button 302 for transmitting an image captured by the image capture apparatus 100 to the user device of the talking partner 309, an audio button 303 for transmitting the audio of the user 308, and a call button 304 for starting and ending a video call.

FIG. 3B illustrates an example of the state of the image capture apparatus and the information processing apparatus when the video call application is starting a video call according to the present embodiment.

The information processing apparatus 200 of the user 308 and the user device of the talking partner 309 are connected via the video call application, and two-way communication of image data and audio data with the user device of the talking partner 309 is performed, thus enabling a video call.

When the user 308 receives a video call start request from the user device of the talking partner 309, the user 308 can operate the call button 304 to respond to the video call start request.

When the user 308 responds to the video call start request from the talking partner 309, an image of the talking partner 309 is displayed on the screen 305 of the GUI 301.

The state in FIG. 3B is a state in which an image of the user 308 is only displayed on the display unit 106 of the image capture apparatus 100 because the image capture apparatus 100 is not transmitting the image data and/or audio data of the user 308 to the information processing apparatus 200.

FIG. 3C illustrates an example of the state of the image capture apparatus and the information processing apparatus during a video call of the video call application according to the present embodiment.

This state is a state in which the user 308 is currently live, with the image capture apparatus 100 starting a transmission of the image data and the audio data of the user 308 to the information processing apparatus 200 in response to a video call start request from the talking partner 309.

The information processing apparatus 200 transmits the image data and the audio data of the user 308 successively received from the image capture apparatus 100 to the user device of the talking partner 309 via the video call application and receives the image data and the audio data of the talking partner 309 from the user device of the talking partner 309. In the example in FIG. 3C, an image of the talking partner 309 is displayed in a large size in the center of the screen 305 of the GUI 301 by the display unit 206 of the information processing apparatus 200, and an image 310 of the user 308 is displayed in a smaller size at the bottom-right of the screen 305.

When the user 308 operates the image button 302, the image data captured by the image capture unit 102 of the image capture apparatus 100 is stored in the working memory 104, converted to image data suitable for display by the video call application using the control unit 101, and transmitted from the connection unit 109 to the information processing apparatus 200 via the connection cable 306.

First information 311 indicating that processing to transmit the image data and the audio data to the information processing apparatus 200 is in progress is displayed on the display unit 106 of the image capture apparatus 100. The first information 311 is an icon indicating currently live, for example.

Also, when the user 308 operates the audio button 303, the audio data gathered by the audio input unit 107 of the image capture apparatus 100 is transmitted from the connection unit 109 to the information processing apparatus 200 via the connection cable 306. When the user 308 operates the audio button 303 again, transmission of the audio data gathered by the audio input unit 107 of the image capture apparatus 100 to the information processing apparatus 200 is stopped. In this manner, by the user 308 operating the audio button 303, the user can activate a state in which audio is transmitted to the information processing apparatus 200 or a muted state.

The information processing apparatus 200 holds the image data of the user 308 received from the image capture apparatus 100 via the connection unit 209 and the connection cable 306 in the working memory 204, and the control unit 201 executes processing to transmit the image data to the user device of the talking partner 309 via the video call application and executes processing to display this on the screen 305 of the GUI 301.

Figure 3D:
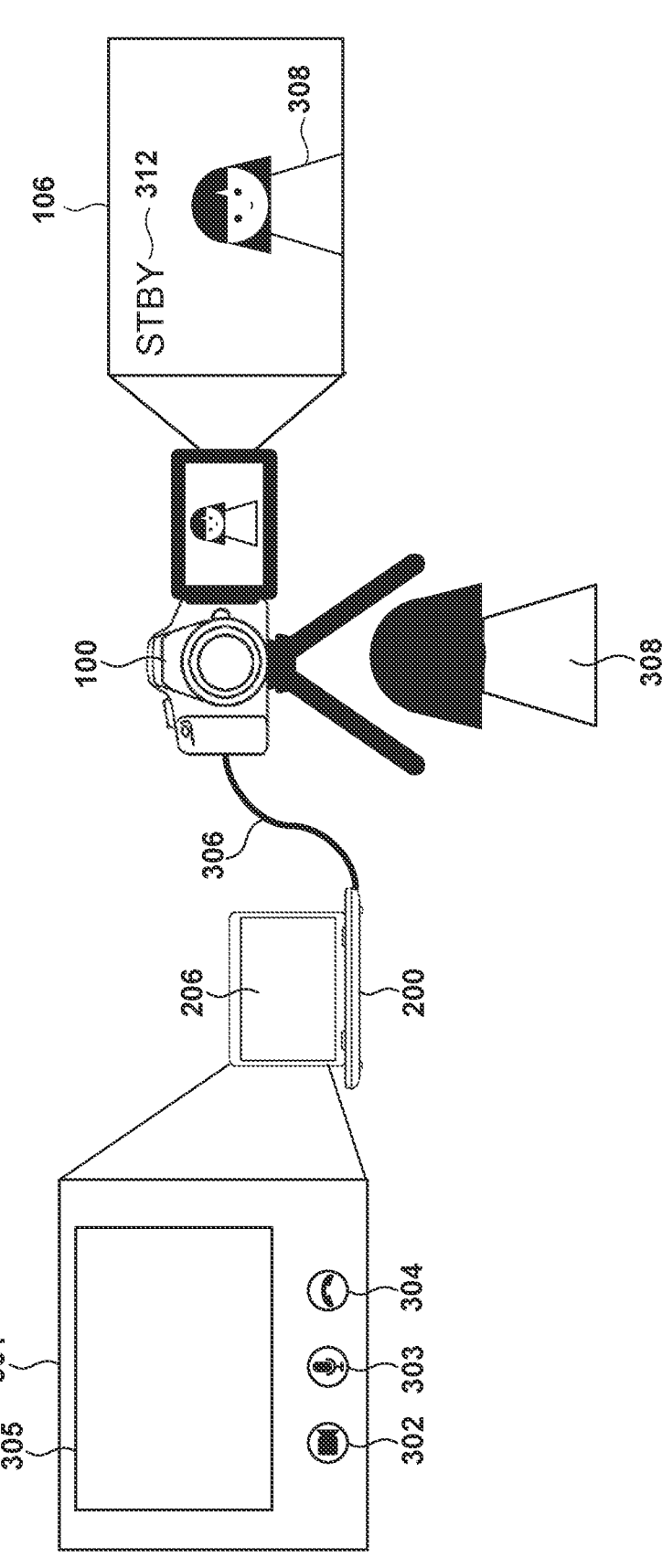
FIG. 3D is a diagram illustrating the state of the image capture apparatus and the information processing apparatus when the video call application is ending a video call according to the present embodiment.

FIG. 3D illustrates an example of the state of the image capture apparatus and the information processing apparatus when the video call application is ending a video call according to the present embodiment.

When the user 308 operates the call button 304 when in a video call with the talking partner 309, the video call is ended.

When the call button 304 is operated when in a video call, the video call application of the information processing apparatus 200 changes the screen 305 of the GUI 301 displaying an image of the user of the talking partner 309 to a non-display state.

Second information 312 indicating that processing to transmit the image data and the audio data to the information processing apparatus 200 is not in progress is displayed on the display unit 106 of the image capture apparatus 100. The second information 312 is an icon indicating standby, for example.

Here, the characteristics of the OS of the information processing apparatus 200 or the load situation may cause video call end determination is take some time, meaning that the second information (standby icon) 312 cannot be displayed on the display unit 106 of the image capture apparatus 100 at the appropriate timing. Thus, in the present embodiment, using the processing described later using FIGS. 4, 5, and 6, irrespective of the characteristics of the OS of the information processing apparatus 200 and the load situation, video call end determination can be swiftly and accurately executed, and the second information 312 can be displayed at the appropriate timing.

First Video Call End Determination Processing

Figure 4:
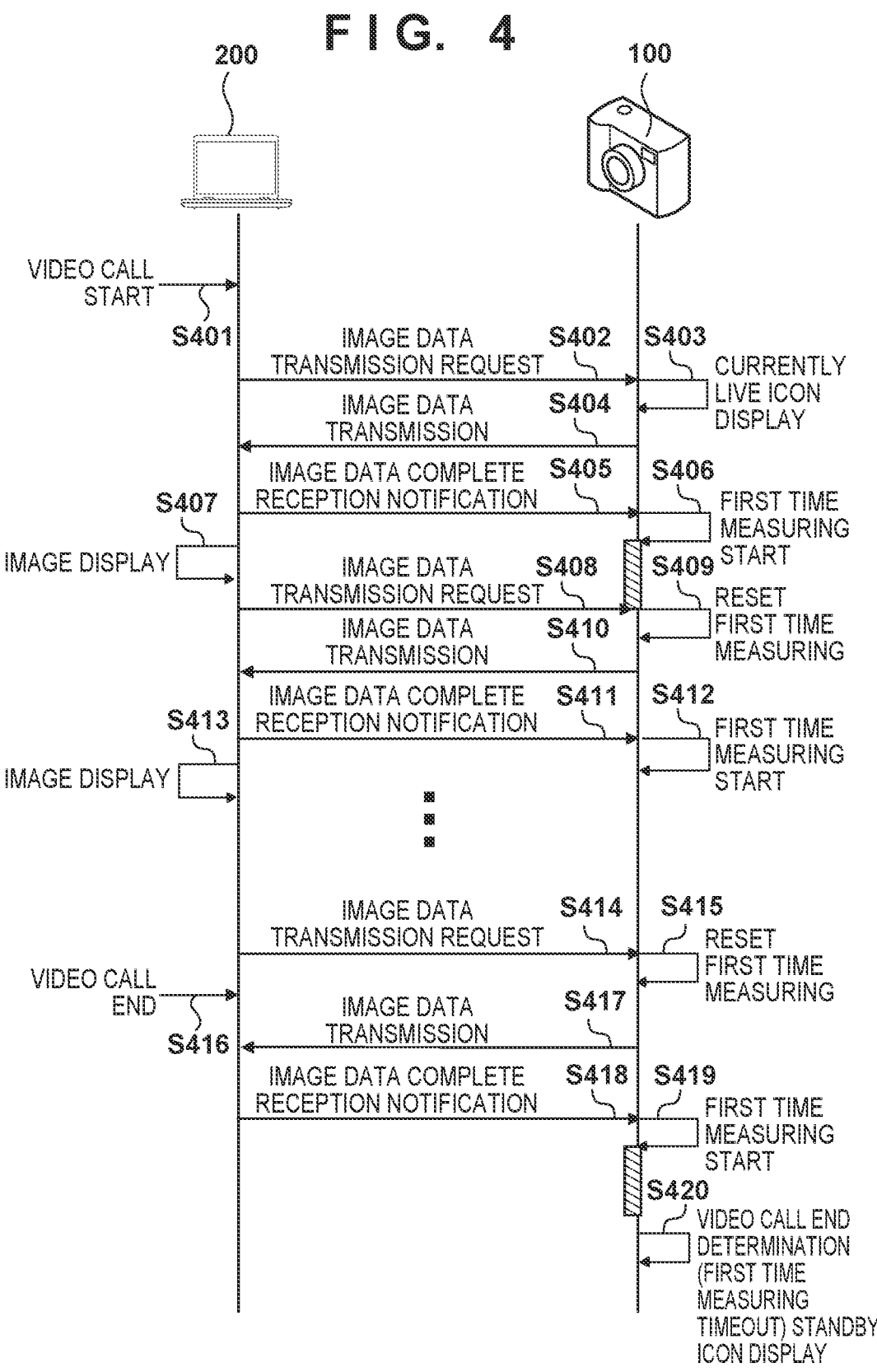
FIG. 4 is a sequence diagram illustrating a first video call end determination processing during a video call according to the present embodiment.

FIG. 4 is a sequence diagram illustrating the first video call end determination processing during a video call.

In the first video call end determination processing, after the image capture apparatus 100 transmits the image data to the information processing apparatus 200, the image capture apparatus 100 starts the first time measuring by the first timer 101a in response to a reception of a notification of complete reception of an image data from the information processing apparatus 200. When the first amount of time elapses without a notification of complete reception of an image data being received, the image capture apparatus 100 determines that the video call ends. Then, the image capture apparatus 100 executes control to display the second information (standby icon) 312 on the display unit 106.

In the following, it is assumed that the state is a state in which the video call application is running on the information processing apparatus 200 and an image of the user of the talking partner 309 is displayed on the screen 305 of the GUI 301 as illustrated in FIG. 3B.

In step S401, in response to the user 308 operating the call button 304 on the screen 305 of the GUI 301 in the state of FIG. 3A, the state is set to the video call enabled state illustrated in FIG. 3B.

In step S402, in response to the user 308 operating the image button 302 on the screen 305 of the GUI 301 in the state of FIG. 3B, the control unit 201 of the information processing apparatus 200 transmits a transmission request of the first frame of the image data to the image capture apparatus 100 via the connection unit 209.

In step S403, when the image capture apparatus 100 receives the image data transmission request from the information processing apparatus 200, the control unit 101 reads out the first information (the currently live icon) 311 from the non-volatile memory 103, renders the display data with the working memory 104, and displays this on the display unit 106.

In step S404, the image capture apparatus 100 stores the image data of the user 308 captured by the image capture unit 102 in the working memory 104, and the control unit 101 converts this to image data suitable for display by the video call application and transmits this from the connection unit 109 to the information processing apparatus 200.

In step S405, when the information processing apparatus 200 receives the image data from the image capture apparatus 100, the control unit 201 transmits a notification of complete reception of an image data to the image capture apparatus 100 via the connection unit 209.

In step S406, when the image capture apparatus 100 receives the notification of complete reception of an image data from the information processing apparatus 200, the control unit 101 starts the first time measuring by the first timer 101a and holds a first time measuring time t1 in the working memory 104. The first timer 101a resets the first time measuring when the first amount of time (a short amount of time equaling approximately 100 ms, for example) elapses since the first time measuring has started or when a transmission request for the second frame of image data is received from the information processing apparatus 200 before the first amount of time has elapsed.

In step S407, the control unit 201 of the information processing apparatus 200 displays the image 310 of the user 308 received from the image capture apparatus 100 as illustrated in FIG. 3C on the screen 305 of the GUI 301 displayed on the display unit 206. Note that in step S404, the image capture apparatus 100 may transmit the image data to the information processing apparatus 200 without converting it to image data suitable for display via the video call application, and, at the information processing apparatus 200, the image data received from the image capture apparatus 100 may be converted to image data suitable for display via the video call application and displayed on the display unit 206.

In step S408, the information processing apparatus 200 executes processing similar to that of step S402 on the second frame of image data.

In step S409, the control unit 101 of the image capture apparatus 100 resets the first time measuring by the first timer 101a has started in step S406.

In step S410, the image capture apparatus 100 executes processing similar to that of step S404 on the second frame of image data.

In step S411, the information processing apparatus 200 executes processing similar to that of step S405 on the second frame of image data.

In step S412, the image capture apparatus 100 executes processing similar to that of step S406 on the second frame of image data.

In step S413, the information processing apparatus 200 executes processing similar to that of step S407 on the second frame of image data.

In this manner, processing similar to that of steps S402 to S407 is repeated for image data up to the N-th (N is a natural number of three or greater) frame after the third frame. Accordingly, each time the information processing apparatus 200 receives the image 310 of the user 308 from the image capture apparatus 100, the image of the screen 305 of the GUI 301 displayed on the display unit 206 can be updated.

The processing of steps S414 to S420 indicates processing for the image capture apparatus 100 to determine the end of a video call when the user 308 operates the call button 304 of the GUI 301. In the example described later, just after the image capture apparatus 100 receives an image data transmission request from the information processing apparatus 200 and the call button 304 is operated, video call end determination is executed.

In step S414, the information processing apparatus 200 executes processing similar to that of step S402 on the N-th frame of image data.

In step S415, the control unit 101 of the image capture apparatus 100 resets the first time measuring by the first timer 101*a* started in response to a reception of a notification of complete reception of the image data of the N−1-th frame.

In step S416, when the call button 304 of the GUI 301 is operated by the user 308, the information processing apparatus 200 executes video call end processing.

In step S417, the control unit 101 of the image capture apparatus 100 transmits, to the information processing apparatus 200, the image data of the N-th frame via the connection unit 209 in response to the image data transmission request received in step S414.

In step S418, the information processing apparatus 200 executes processing similar to that of step S405 on the N-th frame of image data.

In step S419, as in step S406, the control unit 101 of the image capture apparatus 100 starts the first time measuring by the first timer 101*a* for the image data of the N-th frame. Here, since the video call has been ended in step S416, the information processing apparatus 200 does not transmit a transmission request for the image data of the N+1-th frame. Thus, in the image capture apparatus 100, the first amount of time since the first timer 101*a* has started first time measuring elapses, and the first time measuring is reset.

In step S420, in response to the first amount of time having elapsed since the first timer 101*a* has started the first time measuring in step S419, the control unit 101 of the image capture apparatus 100 determines that the video call ends. Then, the image capture apparatus 100 displays the second information (standby icon) 312 on the display unit 106 as illustrated in FIG. 3D.

In the first video call end determination processing described above, when the information processing apparatus 200 is provided with the characteristic of transmitting a notification of complete reception of an image data, the image capture apparatus 100 can determine the end of a video call within a short amount of time after the video call ends. However, when the information processing apparatus 200 is not provided with the characteristic of transmitting a notification of complete reception of an image data, the image capture apparatus 100 cannot determine the end of a video call. Next, a configuration that enables the image capture apparatus 100 to determine the end of a video call even when the information processing apparatus 200 is not provided with the characteristic of transmitting a notification of complete reception of an image data will be described.

Second Video Call End Determination Processing

FIG. 5 is a sequence diagram illustrating the second video call end determination processing during a video call.

In the second video call end determination processing, the image capture apparatus 100 receives an image data transmission request from the information processing apparatus 200 and determines that a video call ends when the second amount of time elapses since the second timer 101*b* has started the second time measuring in response to transmitting the image data to the information processing apparatus

200, without the next image data transmission request being received. Then, the image capture apparatus 100 executes control to display the second information (standby icon) 312 on the display unit 106.

In the following, it is assumed that the state is a state in which the video call application is running on the information processing apparatus 200 and an image of the user of the talking partner 309 is displayed on the screen 305 of the GUI 301 as illustrated in FIG. 3B.

In step S501, the state is similar to that in step S401 in FIG. 4.

In step S502, the information processing apparatus 200 executes processing similar to that in step S402 in FIG. 4.

In step S503, the image capture apparatus 100 executes processing similar to that in step S403 in FIG. 4.

In step S504, the image capture apparatus 100 executes processing similar to that in step S404 in FIG. 4.

In step S505, just after the image capture apparatus 100 transmits the image data to the information processing apparatus 200 in step S504, the control unit 101 starts the second time measuring by the second timer 101*b* different from the first timer 101*a* and holds a second time measuring time t2 in the working memory 104. The second timer 101*b* resets the second time measuring when the second amount of time (an amount of time equaling approximately 1 to 2 seconds, for example) elapses since the second time measuring has started or when a transmission request for the second frame of image data is received from the information processing apparatus 200 before the second amount of time has elapsed.

In step S506, as in step S405 in FIG. 4, the control unit 201 of the information processing apparatus 200 transmits a notification of complete reception of the image data of the first frame to the image capture apparatus 100. In this case, the processing is different from the first video call end determination processing in FIG. 4, and, at the point in time when the information processing apparatus 200 transmits the notification of complete reception of an image data to the image capture apparatus 100, the second time measuring by the second timer 101*b* is still continuing.

In step S507, the information processing apparatus 200 executes processing similar to that in step S407 in FIG. 4.

In step S508, the information processing apparatus 200 executes processing similar to that of step S502 on the second frame of image data.

In step S509, the control unit 101 of the image capture apparatus 100 resets the second time measuring by the second timer 101*b* started in step S505.

In step S510, the image capture apparatus 100 executes processing similar to that of step S504 on the second frame of image data.

In step S511, the image capture apparatus 100 executes processing similar to that of step S505 on the second frame of image data.

In step S512, the information processing apparatus 200 executes processing similar to that of step S506 on the second frame of image data.

In step S513, the information processing apparatus 200 executes processing similar to that of step S507 on the second frame of image data.

In this manner, processing similar to that of steps S502 to S507 is repeated for image data up to the N-th (N is a natural number of three or greater) frame after the third frame. Accordingly, each time the information processing apparatus 200 receives the image 310 of the user 308 from the image capture apparatus 100, the image of the screen 305 of the GUI 301 displayed on the display unit 206 can be updated.

The processing of steps S514 to S519 indicates processing for the image capture apparatus 100 to determine the end of a video call when the user 308 operates the call button 304 of the GUI 301. In the example described later, just after the image capture apparatus 100 receives an image data transmission request from the information processing apparatus 200 and the call button 304 is operated, video call end determination is executed.

In step S514, the information processing apparatus 200 executes processing similar to that of step S502 on the N-th frame of image data.

In step S515, the control unit 101 of the image capture apparatus 100 resets the second time measuring by the second timer 101*b* started in response to transmitting the image data of the N−1-th frame.

In step S516, when the call button 304 of the GUI 301 is operated by the user 308, the information processing apparatus 200 executes video call end processing.

In step S517, the control unit 101 of the image capture apparatus 100 transmits, to the information processing apparatus 200, the image data of the N-th frame via the connection unit 109 in response to the image data transmission request received in step S514.

In step S518, as in step S505, the control unit 101 of the image capture apparatus 100 starts the second time measuring by the second timer 101*b* for the image data of the N-th frame. Here, since the video call has been ended in step S516, the information processing apparatus 200 does not transmit a transmission request for the image data of the N+1-th frame. Thus, in the image capture apparatus 100, the second amount of time since the second timer 101*b* has started second time measuring elapses, and the second time measuring is reset.

In step S519, in response to the second amount of time having elapsed since the second timer 101*b* has started the second time measuring in step S518, the control unit 101 of the image capture apparatus 100 determines that the video call ends. Then, the image capture apparatus 100 displays the second information (standby icon) 312 on the display unit 106 as illustrated in FIG. 3D.

In the second video call end determination processing described above, it is expected that the information processing apparatus 200 is not provided with the characteristic of transmitting a notification of complete reception of an image data. In this case, since the image capture apparatus 100 cannot determine that a video call ends, the end of a video call is determined using the condition that the second amount of time for the second time measuring time t2 elapses since the image data transmission. In this manner, even when the information processing apparatus 200 is not provided with the characteristic of transmitting a notification of complete reception of an image data, the image capture apparatus 100 can determine the end of a video call within seconds of the video call ending. However, when the information processing apparatus 200 is provided with the characteristic of transmitting a notification of complete reception of an image data, the amount of time taken by the image capture apparatus 100 to determine the end of a video call is too long.

Regarding this, the configuration described later solves both the problem of the first video call end determination processing (the information processing apparatus 200 not being provided with the characteristic of transmitting a notification of complete reception of an image data) and the problem of the second video call end determination processing (the information processing apparatus 200 being provided with the characteristic of transmitting a notification of complete reception of an image data) by combining the first video call end determination processing using the first timer 101*a* and the second video call end determination processing using the second timer 101*b* and enabling the image capture apparatus 100 to determine the end of a video call.

Third Video Call End Determination Processing

FIG. 6 is a sequence diagram illustrating the third video call end determination processing during a video call.

In the third video call end determination processing, after the image capture apparatus 100 transmits the image data to the information processing apparatus 200, the image capture apparatus 100 starts the first time measuring by the first timer 101*a* in response to a reception of a notification of complete reception of an image data from the information processing apparatus 200. When the first amount of time elapses without a notification of complete reception of an image data being received, the image capture apparatus 100 determines that the video call ends. Then, the image capture apparatus 100 executes control to display the second information (standby icon) 312 on the display unit 106.

Also, the image capture apparatus 100 receives an image data transmission request from the information processing apparatus 200 and, in response to the image capture apparatus 100 transmitting the image data to the information processing apparatus 200, starts the second time measuring by the second timer 101*b*. When the second amount of time elapses in a state where a transmission request for the next image data has not been received, the image capture apparatus 100 determines that the video call ends. Then, the image capture apparatus 100 executes control to display the second information (standby icon) 312 on the display unit 106.

In the following, it is assumed that the state is a state in which the video call application is running on the information processing apparatus 200 and an image of the user of the talking partner 309 is displayed on the screen 305 of the GUI 301 as illustrated in FIG. 3B.

In step S601, the state is similar to that in step S401 in FIG. 4.

In step S602, the information processing apparatus 200 executes processing similar to that in step S402 in FIG. 4.

In step S603, the image capture apparatus 100 executes processing similar to that in step S403 in FIG. 4.

In step S604, the image capture apparatus 100 executes processing similar to that in step S404 in FIG. 4.

In step S605, the image capture apparatus 100 executes processing similar to that in step S505 in FIG. 5.

In step S606, as in step S405 in FIG. 4, the control unit 201 of the information processing apparatus 200 transmits a notification of complete reception of the image data of the first frame to the image capture apparatus 100. In this case, the processing is different from the first video call end determination processing in FIG. 4, and, at the point in time when the information processing apparatus 200 transmits the notification of complete reception of an image data to the image capture apparatus 100, the second time measuring by the second timer 101*b* is still continuing.

In step S607, the image capture apparatus 100 executes processing similar to that in step S406 in FIG. 4.

In step S608, the information processing apparatus 200 executes processing similar to that in step S407 in FIG. 4.

In step S609, the information processing apparatus 200 executes processing similar to that of step S602 on the second frame of image data.

In step S610, the control unit 101 of the image capture apparatus 100 resets the second time measuring by the second timer 101b started in step S605. Also, the control unit 101 of the image capture apparatus 100 resets the first time measuring by the first timer 101a started in step S607.

In step S611, the image capture apparatus 100 executes processing similar to that of step S604 on the second frame of image data.

In step S612, the image capture apparatus 100 executes processing similar to that of step S605 on the second frame of image data.

In step S613, the information processing apparatus 200 executes processing similar to that of step S606 on the second frame of image data.

In step S614, the image capture apparatus 100 executes processing similar to that of step S607 on the second frame of image data.

In step S615, the information processing apparatus 200 executes processing similar to that of step S608 on the second frame of image data.

In this manner, processing similar to that of steps S602 to S608 is repeated for image data up to the N-th (N is a natural number of three or greater) frame after the third frame. Accordingly, each time the information processing apparatus 200 receives the image 310 of the user 308 from the image capture apparatus 100, the image of the screen 305 of the GUI 301 displayed on the display unit 206 can be updated.

The processing of steps S616 to S624 indicates processing for the image capture apparatus 100 to determine the end of a video call when the user 308 operates the call button 304 of the GUI 301. In the example described later, just after the image capture apparatus 100 receives an image data transmission request from the information processing apparatus 200 and the call button 304 is operated, video call end determination is executed.

In step S616, the information processing apparatus 200 executes processing similar to that of step S602 on the N-th frame of image data.

In step S617, the control unit 101 of the image capture apparatus 100 resets the second time measuring by the second timer 101b started in response to transmitting the image data of the N−1-th frame. Also, the control unit 101 of the image capture apparatus 100 resets the first time measuring by the first timer 101a started in response to a reception of a notification of complete reception of the image data of the N−1-th frame.

In step S619, the image capture apparatus 100 executes processing similar to that of step S604 on the N-th frame of image data.

In step S620, the image capture apparatus 100 executes processing similar to that of step S605 on the N-th frame of image data.

Here, when the information processing apparatus 200 is provided with the characteristic of transmitting a notification of complete reception of an image data, in step S621, as in step S606, the information processing apparatus 200 transmits a notification of complete reception of an image data for the image data of the N-th frame to the image capture apparatus 100.

In step S622, the image capture apparatus 100 executes processing similar to that of step S607 on the N-th frame of image data.

In step S623, in response to the first amount of time having elapsed since the first timer 101a has started the first time measuring in step S622, the control unit 101 of the image capture apparatus 100 determines that the video call ends. Then, the image capture apparatus 100 displays the second information (standby icon) 312 on the display unit 106 as illustrated in FIG. 3D.

Also, when the information processing apparatus 200 is not provided with the characteristic of transmitting a notification of complete reception of an image data, in step S624, in response to the second amount of time having elapsed since the second timer 101b has started the second time measuring in step S620, the control unit 101 of the image capture apparatus 100 determines that the video call ends. Then, the image capture apparatus 100 displays the second information (standby icon) 312 on the display unit 106 as illustrated in FIG. 3D.

In the third video call end determination processing described above, when the information processing apparatus 200 is provided with the characteristic of transmitting a notification of complete reception of an image data, the image capture apparatus 100 can determine the end of a video call within a short amount of time after the video call ends. Also, when the information processing apparatus 200 is not provided with the characteristic of transmitting a notification of complete reception of an image data, the image capture apparatus 100 can determine the end of a video call within seconds of the video call ending.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-078953, filed May 12, 2022 which is hereby incorporated by reference herein in its entirety.

What is claimed is:

1. An image capture apparatus comprising:
a connection unit that connects to an external apparatus;
an image capture unit that captures an image; and
a control unit that executes processing to transmit an image captured by the image capture unit to the external apparatus connected via the connection unit in response to a reception of an image transmission request from the external apparatus,
wherein the control unit
starts a first time measuring in response to reception, from the external apparatus, of a reception-completion notification that the external apparatus has completely received a transmitted image and starts a second time measuring in response to the control unit transmitting an image to the external apparatus, and resets the first time measuring and the second time measuring in response to reception of a new image transmission request from the external apparatus; and
cancels a state of executing the processing when a first amount of time elapses since the first time measuring has started or when a second amount of time elapses since the second time measuring has started.

2. The apparatus according to claim 1, wherein the control unit resets the first time measuring and the second time measuring in response to reception of an image transmission request from the external apparatus before the first amount of time elapses since the first time measuring has started or before the second amount of time elapses since the second time measuring has started.

3. The apparatus according to claim 1, wherein the first amount of time is shorter than the second amount of time.

4. The apparatus according to claim 1, wherein the control unit includes a first time measuring unit that executes the first time measuring and a second time measuring unit that executes the second time measuring.

5. The apparatus according to claim 1, wherein the control unit displays first information indicating that a state of executing the processing is continuing on a display unit.

6. The apparatus according to claim 5, wherein the first information is an icon indicating currently live.

7. The apparatus according to claim 1, wherein the control unit displays information indicating that a state of executing the processing is cancelled when the first amount of time elapses since the first time measuring has started or when the second amount of time elapses since the second time measuring has started.

8. The apparatus according to claim 7, wherein the information indicating that the state of executing the processing is cancelled is an icon indicating standby.

9. The apparatus according to claim 1, wherein the image is an image captured by the image capture unit of a user operating the external apparatus.

10. The apparatus according to claim 1, wherein the control unit converts an image captured by the image capture unit to an image suitable for display by the external apparatus and transmits the image suitable for display to the external apparatus.

11. The apparatus according to claim 1, wherein
the external apparatus includes a display unit that displays a GUI (Graphical User Interface) provided by an application that runs on the external apparatus and can execute a video call showing an image of another user received from another user device connected to the external apparatus,
the GUI includes an operation unit that starts or ends a video call with the other user, and
the external apparatus stops a transmission request for the image to the image capture apparatus when an operation is performed to end a video call with the other user via the operation unit.

12. The apparatus according to claim 11, wherein
the GUI further includes a screen that displays an image of the other user, an operation unit that transmits an image of a user operating the external apparatus to the other user device, and an operation unit that transmits audio of a user operating the external apparatus to the other user device.

13. A method of controlling an image capture apparatus which has a connection unit that connects to an external apparatus and an image capture unit that captures an image,
the method comprising:
executing processing to transmit an image captured by the image capture unit to the external apparatus connected via the connection unit in response to a reception of an image transmission request from the external apparatus,
wherein the processing includes
starting a first time measuring in response to reception, from the external apparatus, of a reception-completion notification that the external apparatus has completely received a transmitted image and starting a second time measuring in response to the image capture apparatus transmitting an image to the external apparatus, and resetting the first time measuring and the second time measuring in response to reception of a new image transmission request from the external apparatus, and
cancelling a state of executing the processing when a first amount of time elapses since the first time measuring has started or when a second amount of time elapses since the second time measuring has started.

14. A non-transitory computer-readable storage medium storing a program for causing a computer to function as an image capture apparatus comprising:
a connection unit that connects to an external apparatus;
an image capture unit that captures an image; and
a control unit that executes processing to transmit an image captured by the image capture unit to the external apparatus connected via the connection unit in response to a reception of an image transmission request from the external apparatus,
wherein the control unit
starts a first time measuring in response to reception, from the external apparatus, of a reception-completion notification that the external apparatus has completely received a transmitted image and starts a second time measuring in response to the control unit transmitting an image to the external apparatus, and resets the first time measuring and the second time measuring in response to reception of a new image transmission request from the external apparatus; and cancels a state of executing the processing when a first amount of time elapses since the first time measuring has started or when a second amount of time elapses since the second time measuring has started.

* * * * *